United States Patent
Van Ostrand et al.

(10) Patent No.: US 8,002,450 B2
(45) Date of Patent: Aug. 23, 2011

(54) CAVITY REFLECTOR LIGHT INJECTION FOR FLAT PANEL DISPLAYS

(75) Inventors: Daniel K. Van Ostrand, The Woodlands, TX (US); Martin A. Kykta, Austin, TX (US); Berry Tod Cox, Spring, TX (US)

(73) Assignee: Rambus Inc., Sunnyvale, CA (US)

( * ) Notice: Subject to any disclaimer, the term of this patent is extended or adjusted under 35 U.S.C. 154(b) by 137 days.

(21) Appl. No.: 12/574,700

(22) Filed: Oct. 6, 2009

(65) Prior Publication Data
US 2010/0085750 A1    Apr. 8, 2010

Related U.S. Application Data (60) Provisional application No. 61/103,193, filed on Oct. 6, 2008.

(51) Int. Cl.
*F21V 7/04* (2006.01)

(52) U.S. Cl. ........ 362/606; 362/608; 362/611; 362/617; 362/623

(58) Field of Classification Search .................. 362/600, 362/601, 602, 603, 606, 608, 611, 615, 617, 362/623, 231
See application file for complete search history.

(56) References Cited

U.S. PATENT DOCUMENTS

| | | | |
|---|---|---|---|
| 5,319,491 A | 6/1994 | Selbrede | |
| 6,139,163 A * | 10/2000 | Satoh et al. | 362/612 |
| 6,655,809 B2 | 12/2003 | Suzuki et al. | |
| 6,948,840 B2 * | 9/2005 | Grenda et al. | 362/555 |
| 7,042,618 B2 | 5/2006 | Selbrede et al. | |
| 7,057,790 B2 | 6/2006 | Selbrede | |
| 7,218,437 B2 | 5/2007 | Selbrede | |
| 7,486,854 B2 | 2/2009 | Van Ostrand et al. | |
| 7,581,867 B2 * | 9/2009 | Lee et al. | 362/620 |
| 7,637,645 B2 * | 12/2009 | Hsu et al. | 362/606 |
| 7,703,963 B2 * | 4/2010 | Feng et al. | 362/554 |
| 7,798,696 B2 * | 9/2010 | Lee et al. | 362/612 |
| 2003/0043567 A1 * | 3/2003 | Hoelen et al. | 362/31 |
| 2007/0047258 A1 * | 3/2007 | Yao et al. | 362/615 |
| 2007/0076434 A1 * | 4/2007 | Uehara et al. | 362/616 |
| 2007/0121340 A1 * | 5/2007 | Hoshi | 362/600 |
| 2007/0189036 A1 * | 8/2007 | Chen et al. | 362/613 |
| 2007/0274100 A1 * | 11/2007 | Yang et al. | 362/615 |
| 2008/0075414 A1 | 3/2008 | Van Ostrand | |

FOREIGN PATENT DOCUMENTS

| | | |
|---|---|---|
| EP | 1 113 218 | 2/2007 |
| JP | 2005-353556 | 12/2005 |

OTHER PUBLICATIONS

International Search Report and Written Opinion issued for PCT/US2009/059757, dated May 28, 2010, 9 pages.

* cited by examiner

*Primary Examiner* — Ali Alavi
(74) *Attorney, Agent, or Firm* — Renner, Otto, Boisselle & Sklar, LLP (57) ABSTRACT

The present invention describes a light mixing waveguide including a transparent slab waveguide having a reflectorized edge, a pair of opposing side edges adjacent to the reflectorized edge, a light transfer edge opposite the reflectorized edge, and a plurality of cavities formed inside the slab waveguide, wherein at least one of the side edges is configured to receive light from one or more light sources so that the received light is totally-internally reflected from top and bottom surfaces of the transparent slab waveguide. Interaction of the received light, the cavities, and the reflectorized edge mixes the received light prior to the light passing through the light transfer edge and into a target optical system.

20 Claims, 6 Drawing Sheets

CAVITY REFLECTOR LIGHT INJECTION FOR FLAT PANEL DISPLAYS

CROSS REFERENCE TO RELATED APPLICATION

This application claims priority to U.S. Provisional Patent Application No. 61/103,193, entitled "Cavity Reflector Light Injection for Flat Panel Displays", filed on Oct. 6, 2008, which is herein incorporated by reference.

TECHNICAL FIELD

The present application relates to the field of flat panel displays, and more particularly to providing a light mixing means to enhance the visual performance of transmissive flat panel displays that utilize an edge-illuminated transparent slab waveguide to provide light to the pixel shuttering mechanisms that perform image modulation on the display surface. The range of applicability of the present disclosure is not limited to direct view systems such as flat panel displays or waveguide backlights, but can also be deployed in projection-based display technologies.

BACKGROUND INFORMATION

Various flat panel display systems have been developed over the last several decades. Among them is the Time Multiplexed Optical Shutter disclosed in Selbrede U.S. Pat. No. 5,319,491 (which is incorporated in its entirety herein) and such variations as have been subsequently filed in commonly owned U.S. Pat. Nos. 7,042,618, 7,057,790, 7,218,437, 7,486,854 and U.S. Patent Publication No. 2008/0075414. The fundamental premise of such devices is that light (usually monochromatic light) is edge-injected into a transparent rectangular slab waveguide such that total internal reflection (TIR) of the injected light obtains within the waveguide, which may be mirrored on one or more of the side surfaces to insure maximum transits for rays traveling within the waveguide. The principle of operation for any of the plurality of pixels distributed across the slab waveguide involves locally, selectively, and controllably frustrating the total internal reflection of light bound within the waveguide to emit light at that pixel location. In one pixel architecture, frustration of TIR light bound within the waveguide is achieved by propelling (i.e., moving) an optically-suitable material across a microscopic gap, such that the material is at or near contact with a surface of the slab waveguide in the active position, while in the inactive position the material is sufficiently displaced from the surface of the waveguide so that light and/or evanescent coupling across the gap is negligible. The optically-suitable material, herein referred to as an "active layer", being propelled (i.e., moved) can be an elastically deformable thin sheet (thin layer or film) of polymeric material (e.g., elastomer) with a refractive index selected to optimize the coupling of light during the contact/near-contact events. Switching the active layer between inactive and active positions can occur at very high speeds in order to permit the generation of adequate gray scale levels for multiple primary colored light (e.g., consecutive primary colored lights red-green-blue) at video frame rates in order to avoid excessive motional and color breakup artifacts while preserving smooth video generation. The flat panel display is thus comprised of a plurality of pixels, each pixel representing a discrete subsection of the display that can be individually and selectively controlled in respect to locally propelling the active layer bearing a suitable refractive index across a microscopic gap into contact or near contact with the slab waveguide. The propulsion can be achieved by the electromechanical and/or ponderomotive deformation of the thin sheet of polymeric material, said sheet being tethered at the periphery of the individual pixel geometry by standoffs that maintain the sheet in a suitable spaced-apart relation to the slab waveguide when the pixel is in the quiescent unactuated state. Application of an appropriate electrical potential across a first conductor disposed on or within the slab waveguide and a second conductor disposed on or within the active layer, causes the high-speed motion of the active layer toward the surface of the slab waveguide; actuation is deemed completed when the active layer can move no closer to the slab waveguide (either in itself, or due to physical contact with the waveguide). To facilitate light extraction, an array of micro-optical structures (of various possible geometries, such as frustums or pyramidal sections, etc.) may be optionally disposed on the waveguide-facing side of the active layer, such that pixel actuation entails contact or near-contact of these micro-optical structures with the waveguide, thus frustrating TIR light in such a way that re-direction of extracted light to the viewer is optimized. A more detailed description of micro-optical structures is disclosed in "Optical Microstructures for Light Extraction and Control" U.S. Pat. No. 7,486,854, which is incorporated herein by reference in its entirety.

Certain other display systems use similar (but not identical) principles of operation. Some utilize a backlight system where the pixels literally shutter light, usually by transverse lateral motion of an opaque MEMS-based shuttering element at each pixel parallel to the main surface (e.g., top surface) of the waveguide configured as a true backlight system proper, contra the TIR-based waveguide of Selbrede '491 which is not a true backlight given the TIR-bound condition of light traveling inside it. For a backlight system, light within the slab waveguide should not be maintained in a TIR-compliant state lest it be perpetually bound to the interior of the waveguide. Thus, the bottom surface of the waveguide can be made a scattering surface, or it can diverge from a parallel spaced-apart relation to the top surface of the waveguide, or both, to insure that light continually departs the top surface of the slab waveguide to illuminate the pixel shutter mechanisms arrayed at or above the top surface of the slab waveguide. The appeal of using a slab waveguide for transverse MEMS shutter-based systems is due to the ability to recycle unused light by configuring the waveguide-facing portions of the shutter mechanisms to be nominally reflective. Light not passing through an open shutter may then re-enter the waveguide and can be used elsewhere within the system.

In the case of devices based on Selbrede '491, in which the light sources are arrayed on one edge of the slab waveguide while the opposite end from said edge is mirrored (with either a metallic reflector disposed thereon or by imposition of a perfect dielectric mirror to gain even better reflectance), it has been determined that the luminous uniformity of the display can only be insured when the thickness of the slab waveguide is sufficiently thick. A minimum slab waveguide thickness, t, that can be utilized for the slab waveguide is a function of the length of the waveguide l, the critical angle of the waveguide $\theta_c$ (which is itself a function of the waveguide's refractive index), and the individual optical efficiency of a pixel on the display surface, denoted $\in$. The mean free path of a given photon ensemble from origin at the light source to 99% depletion inside the waveguide is given the Greek symbol $\lambda$, which is not to be confused with the optical wavelength of that light in this context. By detuning the effective individual pixel efficiency $\in$, and using the resulting average mean free path of a photon ensemble prior to 99% depletion, $\lambda$, uniformity has been demonstrated to be readily optimized when λ=3l or greater, thereby establishing a lower bound on slab thickness by the following equation:

$$t = \frac{3 - \left(\frac{\log(0.01)}{\log(1-\varepsilon)}\right)l}{\left(\frac{\cos(\theta_c)\log(0.01)}{\log(1-\varepsilon)}\right)}$$

Applying this constraint to the slab waveguide thickness enables displays based on such waveguides to achieve in excess of 60% optical efficiency (ratio of light flux input to light flux output) while simultaneously insuring far less than 1 dB variation in luminosity across the entire display surface (typically under 0.2 dB variation).

While this constraint is of minimal consequence for many applications, it does present a step backward for applications where the industry trend has been toward thinner display subsystems year after year. Thus, for a cell phone, the thickness constraint might require the waveguide to be up to 2 millimeters thick or more to insure outstanding luminous uniformity, whereas the trend in cell phone display components is for the display to be under 1 mm in total thickness. In actual fact, a waveguide thickness of 0.7 mm is desirable, given that this is a standard thickness for LCD mother glass and TFT active matrix glass. However, so thin a waveguide, by violating the thickness t constraint outlined above, runs a serious risk of suffering from debilitating nonuniformities in brightness across the display surface. The symbol t shall hereafter be denominated the minimum slab waveguide thickness that corresponds to the minimum luminous uniformity threshold limit.

Recent co-pending filings have disclosed various apodization (compensation) means in orienting and configuring the illumination means at the edge(s) of the waveguide (e.g., a varying distribution of light sources along an edge of the waveguide) to resolve luminous nonuniformity. However, the periodicity of the pixels and/or micro-optical structures disposed on the light extraction surface of the display system (e.g., top surface of the slab waveguide), in conjunction with the point source nature of the illumination means (e.g., multiple discrete LEDs), has given rise to other optically undesirable effects, such as Moiré patterns, banding, headlighting (ability to resolve the individual light sources illuminating the display system), and other light artifacts created by using discrete light sources (e.g., LEDs) to feed light to the waveguide. These light artifacts can be sufficiently severe as to create liabilities for displays that otherwise may exhibit reasonable macro-level uniformity. It is an object of the present application to address these artifacts at the illumination source by making the light entering the waveguide sufficiently diffuse (e.g., uniform) that the periodic intensity of the original light from the individual light sources can no longer be individually resolved.

SUMMARY

The problems outlined above may at least in part be solved in some embodiments of the techniques described herein. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

The embodiments of the present disclosure provide a light mixing guide (LMG) that may sufficiently diffuse (i.e., mix) light inserted into the LMG from individual (discrete) light sources, such that the inserted light can no longer be individually resolved, referred to herein as "mixed light", prior to injecting the mixed light into a primary waveguide (PW) of a target display system. Various embodiments of the present invention provide means to customize the light intensity output profile (e.g., linear, non-linear, etc.) that may be subsequently injected into the PW of a target display, in accordance with the particular luminosity requirements of the target display. The LMG of the present disclosure includes a transparent slab waveguide having a reflectorized edge, a pair of opposing side edges adjacent to the reflectorized edge, a light transfer edge opposite the reflectorized edge, and a plurality of hollow cavities formed inside the slab waveguide, wherein at least one of the side edges is configured to receive light from one or more light sources so that the received light is totally-internally reflected from top and bottom surfaces of the transparent slab waveguide. Interaction of the received light with one or more of the hollow cavities and the reflectorized edge mixes the received light prior to the received light passing through the light transfer edge and into a target optical system.

The foregoing has outlined rather broadly the features and technical advantages of one or more embodiments in order that the detailed description that follows may be better understood. Additional features and advantages will be described hereinafter.

BRIEF DESCRIPTION OF THE DRAWINGS

A better understanding of the claimed subject matter can be obtained when the following detailed description is considered in conjunction with the following drawings, in which:

DETAILED DESCRIPTION

In the following description, numerous specific details are set forth to provide a thorough understanding of the embodiments described herein. However, it will be apparent to those skilled in the art that the techniques described may be practiced without such specific details. In other instances, detailed physical features are idealized in order not to obscure the techniques described herein in unnecessary detail. For the most part, details considering geometric considerations and the like have been omitted inasmuch as such details are not necessary to obtain a complete understanding of the claimed subject matter and are within the skills of persons of ordinary skill in the relevant art.

The present disclosure also provides light mixing means to insert light having a desired light intensity (light flux) profile into edge-illuminated slab waveguides, which delivers distinct advantages in display efficiency for several different species of display technology, while avoiding the kind of undesirable optical artifacts arising from the interaction of discrete light sources feeding the slab waveguide and the periodic array of optical shutters (e.g., pixels) or micro-optical structures that are often used to extract light from such displays. A light mixing means and light insertion means is described in the present disclosure to cloak discrete light sources (e.g., primary color light sources) by mixing the light from discrete light sources prior to inserting the mixed light into an edge-illuminated slab waveguide of a display. For example, the light mixing and insertion means may be employed in displays where the pixels modulate light by way of local and selective Frustration of Total Internal Reflection (FTIR) of light traveling inside the waveguide. In FTIR-based display systems, the light mixing means can prevent the aggregation of deleterious optical artifacts arising out of the interaction of non-uniform intensity light emanating from periodic discrete light sources and other optical features (e.g., light-shuttering pixels) that exhibit sufficient periodicity as to give rise to banding effects, headlighting, Moiré patterns, and/or other undesirable optical effects.

The light mixing means of the present disclosure may be employed in display systems that utilize discrete light sources (i.e., point light sources) to provide the initial light to the display. The light mixing means may enable these display systems to deliver their inherent high power efficiency with excellent luminous uniformity across the display surface (regardless of program content) without exhibiting deleterious periodicity-based optical artifacts, thereby making such display systems more competitive and successful in the marketplace. For example, the light mixing means may be employed in certain display architectures that utilize edge-illuminated slab waveguides to provide total internal reflection (TIR) light for FTIR-based displays, FTIR-based backlights for LCD panels, and FTIR-based backlights that serve as light recycling backlight subcomponents for displays that modulate light using, for example, transverse optical shutters or equivalent pixel shuttering mechanisms, to name a few, to enhance their optical performance by enhancing luminous uniformity and minimizing optical artifacts. Furthermore, the light mixing means may have utility in other optical applications beyond that of TIR-based display systems, and can be valuable as a general light mixing means as well.

The present disclosure provides a light mixing waveguide that mixes light from discrete sources (e.g., light emitting diodes (LEDs) or similar near-point light sources) in order to create an isotropic or near-isotropic a desired light flux (e.g., an isotropic light flux) that may be inserted into another optical subsystem (e.g., the backlight of a liquid crystal display, or the TIR waveguide that lies at the core of FTIR-based displays that use the principle of frustrated total internal reflection to turn pixels on and off). For the sake of illustration, the light mixing waveguide described in the present disclosure is illustrated as being utilized in conjunction with a total internal reflection (TIR) waveguide of an FTIR-based display. However, it is to be understood that restriction of the description to this specific TIR waveguide of an FTIR-based display is not intended to restrict the range of applicability of the light mixing waveguide of the present disclosure described herein, which can be incorporated into many other optical systems that would benefit from its light mixing properties.

An exemplary FTIR-based display technology to be enhanced, with the light mixing waveguide disclosed in the present disclosure, is the current iteration of the display technology originally disclosed in U.S. Pat. No. 5,319,491, which is incorporated herein by reference in its entirety. In this illustrative display system, previously described in the Background section, pixels emit light using the principle of frustrated total internal reflection within a display architecture that leverages the principles of field sequential color generation and pulse width modulated gray scale creation. Light is edge-injected into a planar slab waveguide through at least one light injection edge and undergoes total internal reflection (TIR) within the waveguide, trapping the light inside it due to reflective coatings on the slab waveguide's edge opposite the light injection edge(s) and TIR on its upper surface, lower surface, and remaining edges. TIR light is contained within the waveguide by virtue of the waveguide having a refractive index higher than the square root of two, namely, about 1.4142) and a cladding layer (e.g., air) surrounding the slab waveguide. The TIR waveguide may be a rectangular transparent solid usually made of either glass or a suitable polymer, into which a diffuse or "mixed light" (e.g., isotropic light flux) needs to be injected at one or more of its edges (i.e., light injection edges). Distributed across the waveguide is an array of pixels that may be individually controlled to selectively emit light towards a viewer. Each of the plurality of pixels is an electrostatically controlled MEMS structure that propels (i.e., move) a relatively high refractive index thin film layer, hereafter termed the "active layer", by controllably deforming the active layer such that at least a portion of the active layer elastically deforms and moves across a microscopic gap (e.g., typically an air-filled gap measuring between 450 to 1000 nanometers) into contact or near-contact with the upper surface of the TIR waveguide, at which point light transits across from the waveguide to the active layer either by direct contact propagation and/or by way of evanescent coupling. The active layer may optionally include an array of micro-optical structures on the waveguide-facing surface of the active layer to enhance the extraction and re-direction of TIR light from the waveguide when any of the array of pixels is actuated to an activated state.

In conjunction with this illustrative FTIR-based display system, a light mixing waveguide (LMW) may be utilized to inject "mixed light" into the slab waveguide of the illustrative display system, in order to avoid undesirable optical artifacts otherwise associated with the interaction of discrete light sources and the regular distribution (i.e., periodicity) of the pixels. The "mixed light" refers to sufficiently diffuse light that no longer exhibits the periodic light intensity emanating from the discrete light sources. Light from discrete light sources may be mixed with the LMW of the present disclosure to provide a desired light intensity profile for insertion into a primary waveguide (PW) of an optical display. The LMW may be utilized to provide the desired light intensity profile at one or more light injection edges of a primary waveguide in order to provide excellent luminous uniformity across the display surface (regardless of program content), without exhibiting deleterious periodicity-based optical artifacts, thereby making such display systems more competitive and successful in the marketplace. The utility of the light mixing waveguide is particularly beneficial to enhance luminous uniformity and minimize undesirable optical artifacts in displays having a PW thickness less than about 2 mm (e.g., 0.5 to 1.5 mm)

Figure 1A:
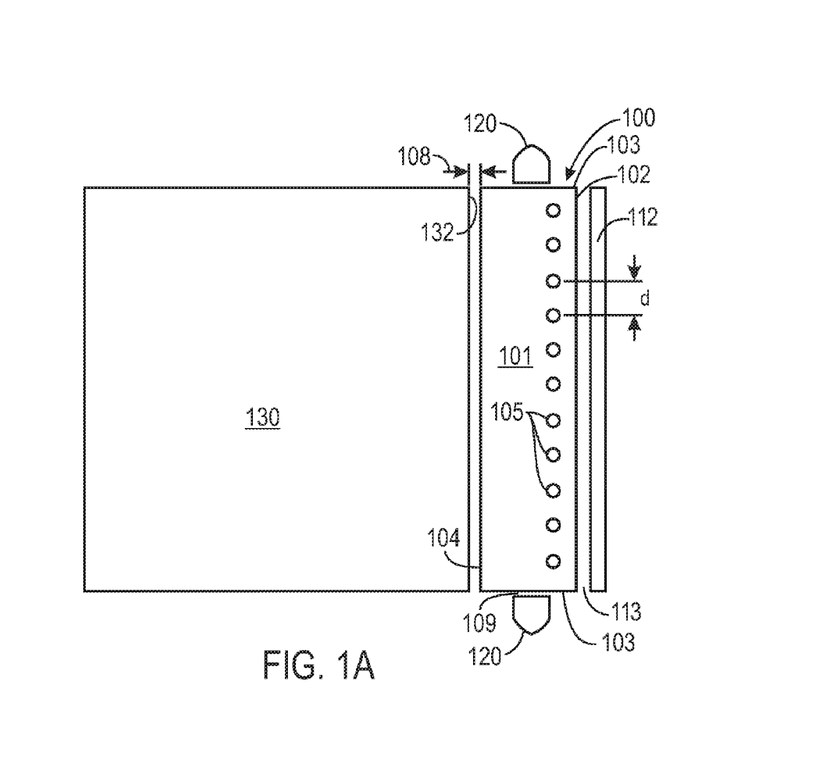
FIGS. 1A and 1B are a top view schematic and a perspective view schematic, respectively, illustrating a light mixing waveguide adjacent a total internal reflection primary waveguide, wherein a plurality of cavities have a substantially constant inter-cavity spacing distance between adjacent cavities, in accordance with an embodiment of the present disclosure.
Figure 1B:
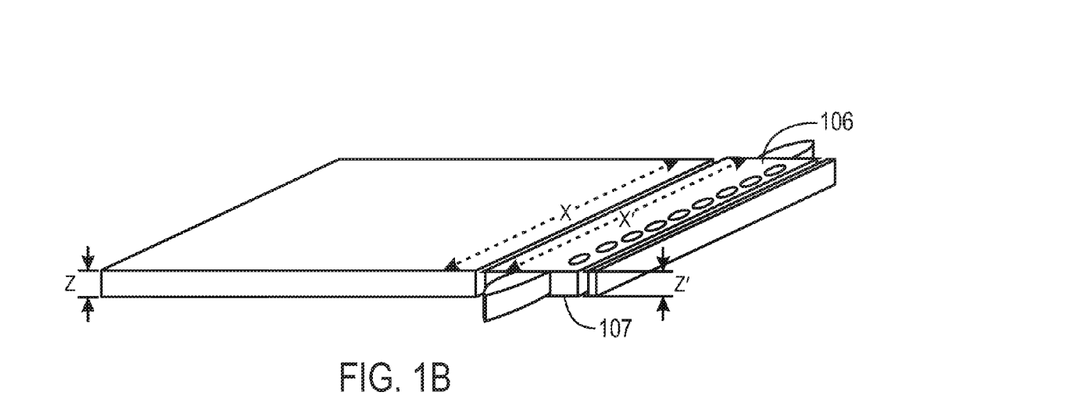

FIGS. 1A and 1B are a top view schematic and a perspective view schematic, respectively, illustrating a light mixing waveguide 100 adjacent a primary waveguide 130 of a target display, for example, the TIR waveguide of the illustrative FTIR-based display system, in accordance with one embodiment of the present disclosure. The separate light mixing waveguide (LMW) 100 may be disposed adjacent a light injection edge 132 of the primary waveguide (PW) 130 in a spaced-apart relationship thereby forming a gap 108 therebetween. As previously described, the PW 130 may be a transparent rectangular solid designed to function as a planar waveguide in which injected light is contained until total internal reflection (TIR) is frustrated by the pixel mechanism of choice. Typically, the PW 130 has a thickness (z) in a range from about 0.5 mm to 4 mm.

The LMW 100 comprises a transparent slab waveguide 101 having a reflectorized edge 102, a pair of opposing side edges 103 adjacent to the reflectorized edge 102, a light transfer edge 104 opposite the reflectorized edge 102, and a plurality of cavities 105 formed inside the slab waveguide 101. The waveguide 101 may be a narrow rectangular slab comprising optical-grade glass or polymer. At least one of the side edges 103 is configured to receive light from one or more light sources 120 (i.e., discrete light sources) so that the received light is totally-internally reflected from a top surface 106 and a bottom surface 107 of the slab waveguide 101. In general, all surfaces of the LMW are orthogonal or parallel to one another and mechanically smooth (to prevent undue scattering, which would result in light that violates TIR). The LMW may further comprise a reflector 112 to provide a reflective property to the reflective edge 102 to assist in directing mixed light out of the LMW through the opposite light transfer edge 104 and into the light injection edge 132 of the PW 130. FIGS. 1A and 1B, then, depict the basic elements that will be further described in greater detail, and provides a reference for the various embodiments described herein.

As illustrated, the LMW 100 may have a height or thickness (z') about equal to the height or thickness (z) of the PW 130. In general, the thickness (z') of the waveguide 101 may be equal to or less than the thickness (z) of the PW 130. Although, to enhance light efficiency and luminosity in the PW 130, preferably the thickness (z') of the waveguide 101 is equal to or nearly equal to the thickness (z) of the PW 130. It should be noted that the thickness (z') of the waveguide 101 may also be thicker than the thickness (z) of the PW 130, however this thickness difference may introduce some light loss when light transfers from a thicker LMW 100 to a thinner PW 130, which detracts from the efficiency of the display system. Suitable waveguide 101 thickness (z') is preferably similar to the thickness (z) of the PW 130 (e.g., thickness less than about 4 mm). As previously mentioned, the LMW is particularly useful to minimize optical artifacts associated with thinner primary waveguides having thicknesses less than about 2 mm. As such a preferable range of the thickness (z') may be less than about 2 mm, and more preferably from about 0.2 to 1.5 mm.

The LMW may be mounted to the PW such that the light transfer edge 104 and the light injection edge 132 are separated by the gap 108 and in alignment along both their thickness (i.e., height) and length dimensions, as illustrated in FIGS. 1A and 1B. The light transfer edge 104 of the LMW 100 may be positioned or aligned adjacent the light injection edge 132 of the PW 130 such that its length dimension (x') extends the entire length dimension (x) of the light injection edge 132, thereby mating the LMW's light transfer edge 104 to the PW's light injection edge 132. In general, the length (x') of the waveguide 101 may be equal to or less than the length (x) of the PW 130. However, to enhance light efficiency and luminosity in the PW 130, preferably the length (x') of the waveguide 101 is equal to or nearly equal to the length (x) of the PW 130. It should be noted that the length (x') of the waveguide 101 may also be longer than the length (x) of the PW 130, however this excess length difference may introduce some light loss when light transfers from a longer LMW 100 to a shorter PW 130, which detracts from the efficiency of the display system. In summary, matching and aligning the height (z') and length (x') dimensions of the light transfer edge 104 to the height (z) and length (x) dimensions of the light injection edge 132 promotes efficient light transfer. Given these criteria, the physical slab of glass or polymer forming the waveguide 101 could in principle be a very thin rectangle, albeit matched in thickness to the PW 130 (or slightly thinner than the PW) into which the LMW 100 will feed its diffused, fully mixed light.

Preferably, the light transfer edge 104 of the LMW 100 is separated from the light injection edge 132 by gap 108. The distance of the gap 108 separating the light transfer edge 104 from the light injection edge 132 may be in a range from about 1 micron to about 100 microns. However, to minimize light leakage (i.e., light loss) as mixed light travels from the light transfer edge 104 to the light injection edge 132, preferably the distance of the gap 108 is in a range from about 1 micron to 50 microns. Ideally, to minimize light loss, the gap 108 may be in a range from about 1 to 10 microns, however in practice this constant gap distance between the entire lengths (x', x) of the edges 104, 132 may be difficult to achieve due to manufacturing challenges. The gap distance 108 is greater than about 1 micron in order to avoid evanescent tunneling of light from the light transfer edge 104 to the light injection edge 132. Evanescent tunneling of light would undesirably permit a significant amount of light to short circuit the mixing features (i.e., plurality of cavities 105) thus not fully mixing the light prior to insertion into the PW 130. Similarly, it should be noted that the light transfer edge 104 of the LMW 100 may be in contact (i.e., gap distance 108 is about equal to 0) with the light injection edge 132 of the PW 130 when assembled for operation, however this configuration would also undesirably permit a significant amount of light to short circuit the mixing features (i.e., plurality of cavities 105) thus not fully mixing the light prior to insertion into the PW 130.

In general, light from the light sources 120 (e.g., LEDs) is injected into the LMW 100 from the side edges 103, wherein a gap 109 between the light sources 120 and the side edges 103 can insure that only TIR-compliant light enters the LMW). The side edges 103 where the light sources 120 are mounted could conceivably be much smaller in dimension than the two long edges, namely the reflectorized edge 102 and the light transfer edge 104, although for light efficiency's sake it is usually considered proper for the light source injection surface (i.e., the surface area of the side edge 103) to be at least as large as the effective active surface of the light sources themselves to avoid lossy overshoot of light. It should be noted that the light sources 120 are shown as unitary sources for conceptual purposes, and their precise position along edge 103 is a matter of design choice. More than one light source 120 can be arrayed on a side edge 103, and the single light source 120 is shown for the purpose of simplifying the description. At this point, it can be appreciated that light traveling from the light sources 120 (which may be, for example, light emitting diodes or LEDs) can pass through the gap 109 into side edge 103, with the resulting light now inserted into the LMW 100 traveling at TIR-compliant angles with respect to the top surface 106 and the bottom surface 107 of the rectangular solid slab waveguide 101.

The actual light mixing may be achieved by the plurality of cavities 105 formed as integrated features into the physical slab waveguide 101 forming the LMW 100. The goal of the LMW 100 is to mix received light therein so as to provide a desired light flux profile to the light injection edge 132 of the PW 130 via the LMW's light transfer edge 104, without perturbing that light from a strict TIR regime (constraining the angles at which light rays travel within the LMW 100 prior to entering the PW 130). Given this criterion, the light rays inserted into the LMW 100 from the light sources 120 should substantially avoid encounters that create angular deviation from TIR compliance. The plurality of cavities 105 serve as the core means of achieving light mixing. In one embodiment, the plurality of cavities 105 may be a plurality of hollow cavities that are formed in the waveguide 101. The cavities 105 may be hollow (e.g., air-filled, vacuum) or comprise some other material (e.g., aerogel, silicone) having a refractive index lower than the refractive index of the light mixing waveguide 101. One important aspect of these hollow cavities are that the cavity walls 310 (illustrated in FIG. 3A discussed below) are perpendicular to the top surface 106 and bottom surface 107 of the LMW, and thus parallel to the reflectorized edge 102, the light transfer edge 104, and the two side edges 103 where the light sources 120 may be mounted. Moreover, the cavity walls 310 are as physically smooth as possible, to reduce or substantially prevent scattering when light encounters the cavity on its journey through the LMW 100. As illustrated in FIGS. 1A and 1B, a linear row of such cavities 105 may be distributed near the reflectorized edge 102 of the LMW 100 and parallel to that edge 102, and have an inter-cavity spacing (d) distance substantially constant between adjacent cavities, in accordance with an embodiment of the present disclosure.

In various embodiments described in more detail below, the interspacing between the cavities 105 can be either uniform (equidistant) or graded as a function of distance from the light sources 120 at the side edges 103. The cavities 105 may be a wide range of cross-sectional shapes that can be selected to optimize light mixing. Moreover, the cavities 105 may be through-hole cavities that extend from the top surface 106 to the bottom surface 107 of the waveguide 101. Alternatively, the cavities may be wholly embedded within the waveguide 101. The particular size and cross-sectional shape of the cavities may be designed to optimize the mixing process. Moreover, the geometric distribution of these cavities 105 inside the LMW 100 may range from simple linear arrays to more elaborate distributions designed to optimize the mixing process and provide the desired light flux profile that needs to be transferred to the particular PW 130.

The reflector 112 may be disposed adjacent the surface of the reflectorized edge 102 and separated therefrom by a gap 113, as illustrated in FIGS. 1A and 1B. Although reflector 112 is shown as comprising considerable thickness, this is for illustrative purposes only, and in actual fact the reflector 112 may be a thin sheet of aluminum or other metallic element preferably positioned in a spaced-apart relationship to the reflectorized edge 102 forming gap 113 therebetween. The reflector 112 may also be a substantially perfect dielectric mirror (i.e., within a selected tolerance) comprised of a series of layers bearing different thicknesses and refractive indices to create an even more efficient reflector at edge 102. Alternatively, the reflector 112 may be disposed directly on the surface of the refelectorized edge 102 (not shown). In this embodiment, the reflector 112 may be a very thin layer of aluminum or other metallization in contact with the reflectorized edge 102. Moreover, the reflector 112 may be a dielectric mirror in intimate contact with the reflectorized edge 102. Therefore, both variations (reflector 112 disposed directly on the surface of edge 102, or the reflector 112 in spaced-apart relation to the surface of edge 102) jointly comprise various embodiments of this disclosure.

The principle of operation of the LMW 100 and the plurality of cavities 105 is that light can pass from the discrete light sources (e.g., LEDs) on the side edges 103 (most likely through a small air gap 109 to insure TIR compliance) into the waveguide 101 of the LMW 100. When a light ray encounters a cavity (e.g., a hollow cavity), it will either reflect or bifurcate (reflect and refract), depending on the refractive index of the waveguide 101 and the angle of incidence the light ray had at the point of intersecting the cavity's surface (i.e., cavity wall 310). A pure reflection occurs at angles where TIR is conserved at the cavity boundary, whereas other rays may not be TIR-compliant in the lateral dimension (albeit all rays are intended to be TIR-compliant with respect to the top surface 106 and the bottom surface 107 of the LMW 100 (and the upper surface and lower surface of the PM 130), referred to herein as azimuthally TIR compliant. As the rays encounter more and more cavities and interact with them and the reflectorized edge 102 of the LMW, a thorough mixing of the light rays that pass through the light transfer edge 104 into the PM 130 will have occurred, creating a very diffuse and uniform light flux across the light transfer edge 104 of the LMW, in accordance with one embodiment of the present disclosure. Light that passes through the light transfer edge 104 of the LMW into the PM, because it is laterally TIR-noncompliant (and azimuthally TIR-compliant), will be in a highly mixed state (i.e., diffuse light) as a result of the interaction of the light source rays with the plurality of cavities and the reflectorized edge 102.

Figure 2A:
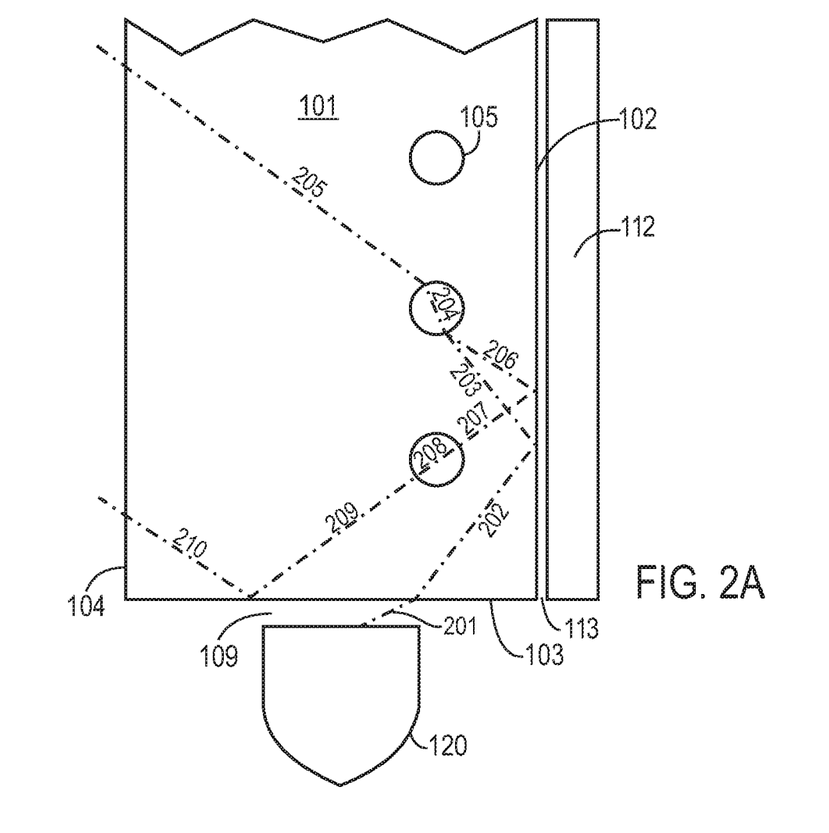
FIG. 2A is a plan view schematic of a section of a light mixing waveguide in the vicinity of one of the light sources illustrating light mixing by depicting light ray splitting (refraction-reflection), and possible paths of the split light rays, as light interacts with the hollow cavity structures and the reflectorized edge of the LMW.

FIG. 2A provides a close-up view of the distal end of the light mixing waveguide 100, inclusive of one of the light sources 120 in spaced-apart relation to the light injection side edge 103. The possible trajectory of one light ray, among the countless rays that are continually injected along the side edge 103 at many different angles and positions, is shown for illustrative purposes so that the various interactions of the ray with the cavities 105 and the reflectorized edge 102 depicted in this embodiment may be better understood. One of the rays illustrated as a ray 201 emitted from the light source 120 passes through side edge 103 of the waveguide 101 and refracts (i.e., bends) to follow the a new ray path 202, the extent of refraction determined by the refractive index of the transparent material comprising the light mixing waveguide 101. The ray 202 then encounters the reflectorized edge 102 and continues on as ray 203 until it encounters one of the hollow cavity structures 105, at which point the single ray splits into two rays 204, 206 (i.e., a reflection-refraction ray split) of potentially unequal intensities based on the laws of optics prevailing at the boundary of the cavity 105 (i.e., cavity wall 310). Part of the original ray 203 travels through the cavity 105 as ray 204, then encounters the opposite wall of the cavity to refract once again as ray 205, which finally passes through the light transfer edge 104 in preparation for entering the light injection edge 132 of PW 130, assuming the angle of incidence at the edge 105 permits such action (i.e., lateral non-TIR angle). There may be subsequent ray-splitting events at each cavity wall (i.e., boundary) encountered by the light ray during its journey, and in the interest of clarity these are not shown. Not only did ray 203 partially refract as ray 204 and 205 to exit the waveguide 101, but the remaining energy in ray 203 also reflected to form a ray 206 which is shown as being sent back toward the reflectorized edge 102 (or reflector 112), interacting again with said reflectorized edge 102 and/or reflector 112 to form ray 207, which in turn encounters another cavity 105a to refract through it as a ray 208 and finally ray 209, which undergoes a total internal reflection event at side edge 103 before becoming ray 210 that passes through the light transfer edge 104. Additional reflection-refraction ray splits, or ray-splitting events, are not shown, but these are known to occur at each boundary introduced by the cavity walls, excepting boundaries where total internal reflection occurs (namely, where the sine values of Snell's Law takes on values greater than 1, indicating that no refraction is occurring, only reflection is occurring, at the pertinent boundary, based on the intrinsic geometry and ratio of refractive indices present at the boundary). Consequently, original ray 201 ends up exiting the waveguide 101 as rays 205 and 210, with additional rays created by ray-splitting events that are omitted from FIG. 2a providing even further sets of rays generated from the original ray 201. This process of splitting the rays laterally by the interaction of the light rays with the cavity structures 105 and the reflectorized edge 102 and/or reflector 112 gives rise to exceptionally good light mixing, creating a very uniform flux of light through the surface of the light transfer edge 105.

Figure 2B:
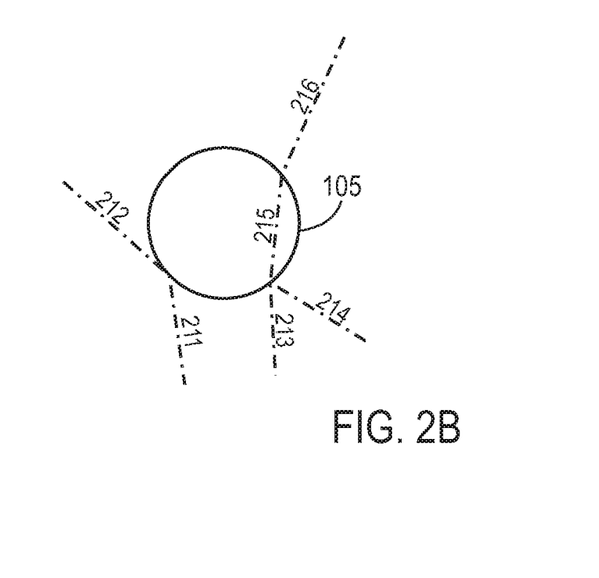
FIG. 2B is a plan view schematic of an individual cavity within a light mixing waveguide illustrating both a total internal reflection light ray interaction with the cavity as well as a refraction-reflection ray splitting interaction with the same cavity to show that both kinds of interactions are continually occurring inside the light mixing waveguide to mix the received light.

FIG. 2B is a plan view close-up of two different light rays 211, 213 encountering a single cavity structure 105, for ease of illustration. Light ray 211 is incident upon the wall of cavity 105 at such an angle that total internal reflection occurs at the surface boundary of the cavity wall, and the reflected ray 212, of identical intensity with the original ray 211, results. However, an incident light ray 213 encounters the surface wall of cavity 105 at a different incidence angle than did light ray 211, such that the ray splits in a reflection-refraction event at said surface, the reflected portion of the ray forming a new departing ray 214, while the refracted portion of the original ray 213 forming a new ray 215 that travels through the middle of the cavity's volume, to encounter the opposite wall of the cavity at an angle that gives rise to the a ray 216 departing the cavity vicinity through said wall. There are additional reflection-refraction events at these cavity wall boundaries, which are omitted in the illustration for the sake of simplifying the depiction and clarifying the basic difference between the two kinds of ray interaction that are possible at a cavity structure boundary (i.e., cavity wall surface): those two ray interactions being either the spitting of the ray into a reflected and refracted ray, or sub-ray, of potentially different intensities whose intensities, when added, substantially total the original intensity of the incident wave that was split in this manner; or the incident ray may undergo total internal reflection and not split so that the original ray's energy is directed into a new reflected ray, such as incident ray 211 reflecting off of the wall of cavity 105 to form total internally reflected ray 212. Note as before that reflection-refraction events can give rise to what are known as daughter rays, and the daughter rays can generate granddaughter rays upon encountering subsequent cavity walls (i.e., boundaries) due to the presence of other cavities 105 subsequently encountered, as well as the material comprising the light mixing waveguide.

In applications where the reflector 112 is not applied directly to the reflectorized surface 102 but rather is in a spaced-apart relation to the surface of edge 102 by a distance of gap 113, the surface of reflectorized edge 102 may exhibit both total internal reflection itself in respect to light incident upon it from inside the light mixing waveguide 101, or ray splitting at reflection-refraction events at the surface of edge 102, such that light exiting the waveguide at edge 102 during such a ray-splitting event may travel across said gap 113 before encountering reflector 112 and being diverted back toward edge 102 for re-entry into the waveguide 101. Multiple ray-splittings are possible at edge 102 when the reflector 112 is detached from the surface of edge 102 and put in a spaced-apart relationship thereto. However, light (e.g., laterally non-TIR compliant light) that exits the waveguide 101 through edge 102 into the gap 113 encounters the reflector 112 and returns to the waveguide 101. The presence of this optional gap 113, which may be filled with air, vacuum, or some other substance (e.g., aerogel, silicone) with a lower refractive index than that of the waveguide 101, may reduce optical flux losses (e.g., light absorption) that often attenuate light rays incident upon metal-blased reflectors. Furthermore, the angular selectivity introduced into the optical behavior of edge 102 by introduction of said gap 113 may further enhance the mixing of light as well. Therefore, although both variations (reflector 112 disposed directly on edge 102, or reflector 112 in spaced-apart relation to edge 102) jointly comprise the matter covered under this disclosure, it may be preferable to minimize any light loss due to interaction of light that strikes a metallic layer (e.g., metallic reflector 112), by optionally positioning the reflector 112 in spaced-apart relationship to the reflectorized edge 102 such that only non-TIR light may strike the metallic reflector 112, as compared to all light (TIR and non-TIR light) when the reflector 112 is disposed in contact with the surface of the reflectorized edge 102.

Figures 3A, 3B:
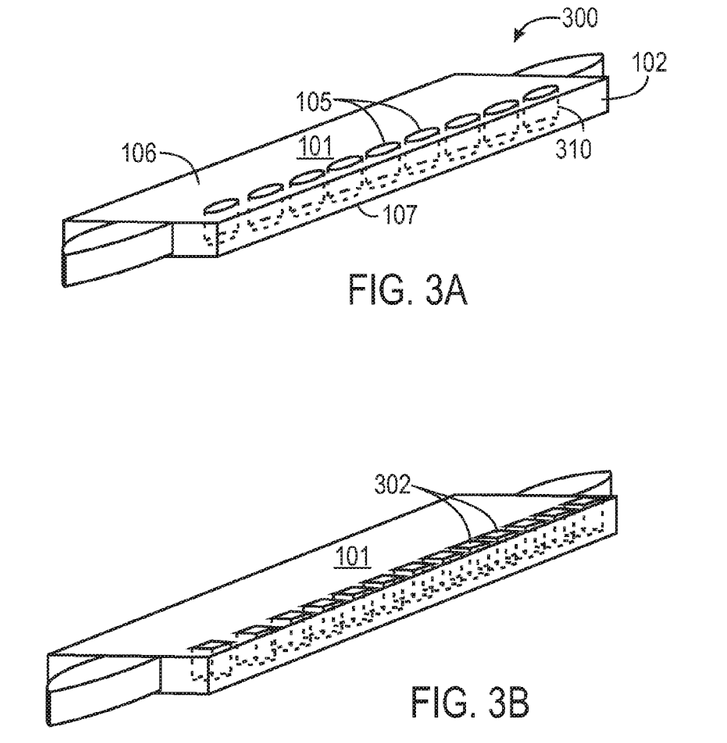
FIGS. 3A, 3B and 3C are perspective views of a light mixing waveguide illustrating a plurality of hollow cavities having various geometries, further illustrating that the cavities may be through-hole cavities (FIGS. 2A and 2B), wherein each cavity extends from a top surface of the LMW to the bottom surface of the LMW, or the cavities may be embedded (FIG. 2C) inside the LMW.

FIG. 3A illustrates in more detail the through-hole nature of a plurality of cavities 105 that may be formed in the waveguide 101. Moreover, the cavities 105 may be through-hole cavities that extend from the top surface 106 to the bottom surface 107 of the waveguide 101. The interior surface of the cavities 105 is a cavity wall 310 that is sufficiently smooth so as to not cause undue scattering out of the top or bottom surfaces 106, 107 of the waveguide 101, which is perpendicular to interior cavity surface and to the cavity symmetry axis, which are themselves substantially parallel to the surface of the reflectorized edge 102 and the light insertion edges 103. Moreover, the cavities 105 are not restricted to a circular cross-section (i.e., cylindrical hollow cavities passing through the waveguide 101). These idealizations are used for the sake of simplifying the description and are not intended to be limiting.

Furthermore, regardless of the choice of cross-sectional geometry of the cavities 105 (in this instance, they are shown as circular for the sake of description), the walls 310 of the cavity should be parallel to waveguide surfaces of edges 103, 102, and 104, and perpendicular to surfaces 106, 107. When this is the case, light entering the waveguide 101 from the light source(s) 120 does not undergo substantial perturbation to non-TIR angles with respect to surfaces 106, 107, but may be perturbed to non-TIR angles with respect to surfaces 103, 102 and 104 after having encountered and optically interacted with any given cavity 105. Furthermore, these light rays may either undergo total internal reflection at the boundary of the hollow cavity 105, based on the angle of incidence upon the cavity wall 310 when the ray encounters it, and based on the ratio of refractive indices between the substance comprising the waveguide 101 and the air or vacuum or other low refractive index material or composition of materials interior to and filling the cavity 105; or the ray will undergo a reflection-refraction split split, with part of the ray traveling through the cavity 105 and another part of the ray reflecting off the boundary of the cavity. In either case, the continual interaction of light rays with the plurality of cavities 105 causes the light to become further mixed and more isotropic, through the above-identified process of TIR reflection or reflection-refraction splitting, a phenomenon also known colloquially as ray-splitting. Such light will also interact with the reflector 112 as well as with the plurality of cavities 105, so that the light distribution approaches a sufficiently mixed and isotropic form to travel through the light transfer edge 104 into the PW 130 through the light injection edge 132. There will be a suitable boundary between 104 and 132, as noted earlier, comprised either by an explicit air gap or other such gap, or a boundary demarcated by a material difference in the index of refraction between 104 and 132 if they should be abutted one to the other. Such a boundary provides the best light mixing behavior and thus constitutes a preferred embodiment, since it forces light back to the cavities 105, so that only light that has been mixed by interaction with one or more of the plurality of cavities 105 is able to finally pass through the boundary between 104 and 132. However, it is possible to have no appreciable boundary difference between 104 and 132, but such an architecture will only mix approximately half of the light being injected into the light mixing waveguide from the light sources 120 since about half of the inserted light will entirely bypass interaction with the cavity structures 105 that give rise to the desired light mixing behavior.

FIG. 3B illustrates the fact that the techniques described herein are not tied to any particular cross-sectional geometry or shape for the hollow cavities that do the TIR reflection or reflection-refraction splitting, and thus achieve the desired mixing of the light being processed by the LMW 101. In this instance, the cross-sectional area of the hollow cavities is a square, and the respective square column-shaped cavities 302. Other possible shapes for the cross-sectional geometry for the hollow cavities are triangular, rectangular, elliptical, hexagonal, pentagonal, octagonal, or other cross-sectional shapes. Although it is expected that fabrication and manufacturing exigencies are more likely to favor circular cross-sections that provide cylindrically-shaped hollow cavities passing through the waveguide 101. The cavities 105 may be a wide range of cross-sectional shapes and sizes that can be selected to optimize light mixing. For example, the size of the cavities 105 may be in a range from about 0.1 mm to about 5 mm.

Figure 3C:
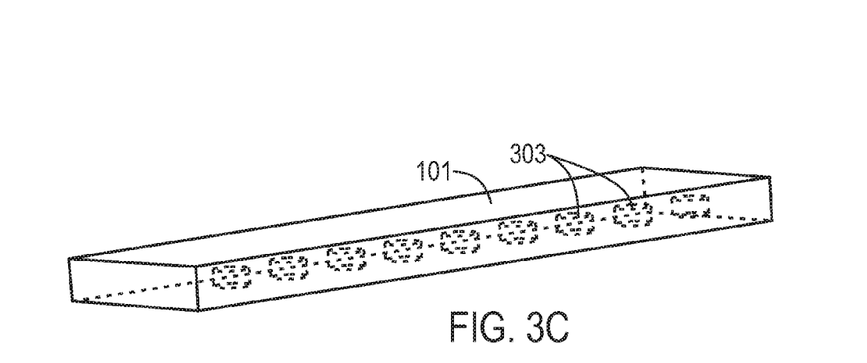

FIG. 3C illustrates that the cavity 303 may be completely embedded inside the waveguide 101. Other configurations of cavities embedded in the waveguide 101 are also possible, and these alternate configurations can serve to optimize light mixing in various ways, while the actual size of the cavity is similarly optimized.

By the same token, the illustrated embodiments are not limited to having each of the cavities 105, 302 comprising the plurality of cavities to be filled with the same material (e.g., air, vacuum, or material of specific refractive index), and it conceivable that varying the composition of the cavity's contents from one cavity to the next can accrue to the optical benefit of the mixing process by altering the optical behavior as a function of position within the light mixing waveguide 101. Furthermore, the illustrated embodiments are not limited by having an isotropic material filling any given cavity, but any given cavity could have more than one refractive index material within it, arranged as desired (either with discrete boundaries between materials or a gradient from one refractive index to another), if such internal compositional variety inside the cavity provides optimal optical light mixing performance not otherwise obtainable from an isotropic interior of the cavities 301.

Figure 4:
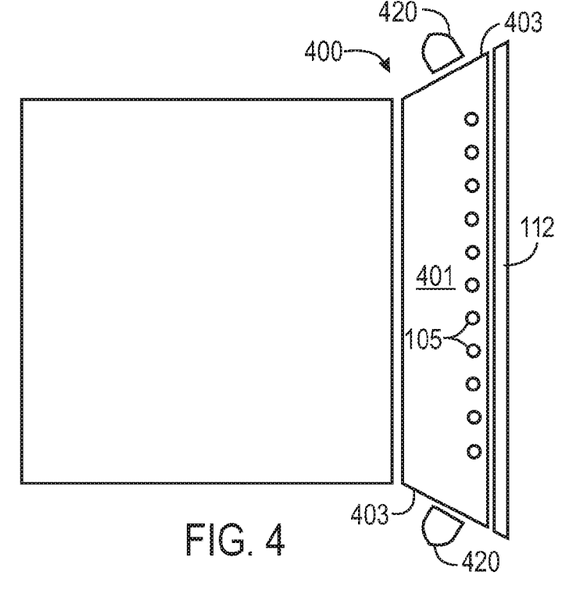
FIG. 4 is a top view schematic illustrating a light mixing waveguide having angled side edges, adjacent a total internal reflection primary waveguide, in accordance with another embodiment of the present disclosure.

There are alternative embodiments that angle the side edges that are used for light injection in order to alter or optimize the angular distribution of light in the waveguide 401, which can be varied depending on the output requirements. For example, the rectangular shape of waveguide 101 in FIG. 1A may be trapezoidal, as illustrated in FIG. 4, or formed another polygonal structure (e.g., square, pentagon, hexagon, etc.), since the light mixing will occur in that instance as well. The narrow rectangular shaped waveguide 101 is selected both for illustrative purposes and because it is likely to represent the lowest possible use of available space for such a LMW 100. FIG. 4 illustrates that side edges 403 may be angled (i.e., angled sides of a trapezoid), and furthermore, that the one or more light sources 420 may be angled adjacent the angled side edges 403 in order to inject light perpendicular to angled side edge 403 and direct the initial light from the discrete light sources 201 into the waveguide 401 and towards one or more cavities 105 therein, thereby increasing the mixing efficiency of the LMW 400. However, it should be noted that angled light sources 420 need not inject light perpendicular to angled side edges 403. For example, the angled light sources 420 depicted in FIG. 4 may substitute the light sources 120 depicted in FIG. 1A in order to inject light into the side edges 103 of rectangular waveguide 101 at an angle with respect to the normal perpendicular to the surface of side edge 103. Injected light can be angled to improve or alter efficiency or flux distribution as light from discrete light sources 120 is introduced into the LMW 100.

Figure 5:
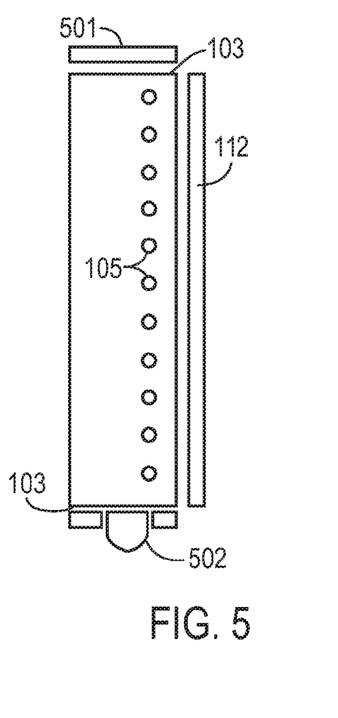
FIG. 5 is a top view schematic illustrating a light mixing waveguide having reflectors disposed adjacent its two side edges, in accordance with another embodiment of the present disclosure.

It should be noted that the efficiency of any light mixing means is also a function of light leakage, and that there are potential locations in the LMW 100 where leakage might occur, such as at side edges 103, so that reflective means may be imposed on such surfaces, or be associated with the light sources 120 themselves, albeit not in such a way as to occlude any light source injecting light into the slab waveguide 101, so as to contain as much light as possible inside the waveguide 101 so that the mixed light's primary departure route is out through the light transfer edge 104 and into the PW 130 through edge 132, as illustrated in FIG. 5. In another aspect, light sources 502 need not be located on both edges 103 but can be added on only one edge 103 with the opposing edge being itself reflectorized by reflective element 501, as illustrated in FIG. 5. In the case of mating a single light source to one of the side edges, the opposing side edge would also be a reflective surface. It is further noted, that with only one edge illuminated, the cavities may be adjusted in density, distribution, size, and interspacing, to insure an isotropic flux under such a light injection scenario.

Figure 6:
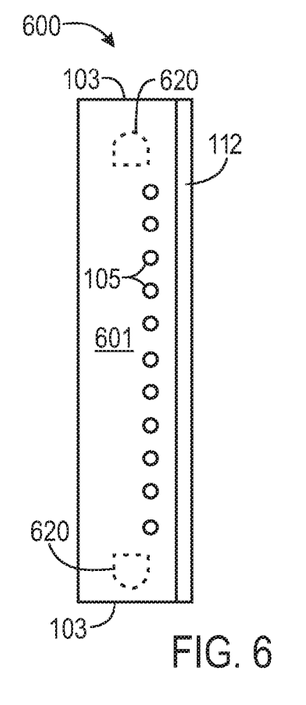
FIG. 6 is a top view schematic illustrating a light mixing waveguide having light sources embedded inside the LMW, in accordance with another embodiment of the present disclosure.

There are also alternative embodiments that allow for the light source to be embedded into the LMW 600, as illustrated in FIG. 6. Light sources 620 may be embedded inside the waveguide 601 (e.g., near the 103 side edges or elsewhere in the LMW) as illustrated in FIG. 6, rather than being disposed outside the LMW in spaced-apart relationship with an air gap therebetween as previously depicted with respect to FIGS. 1A and 1B. A reflective shield surrounding at least a portion of each of the embedded light sources 620 may be introduced (not shown) to insure TIR-compliance of such injected light being imposed, if needed.

In another aspect, FIG. 6 also illustrates that reflector 112 may be applied directly to the surface 102, rather than in a spaced-apart relation to surface 102. The reflector 112 in contact with surface 102 may impart excellent reflective properties to the surface 102, however there is a certain amount of light attenuation (i.e., light loss) due to light rays incident upon metal-blased reflectors. To minimize light loss, the reflector 112 may be in a spaced apart relationship to surface 102 with this optional gap 113, to reduce optical flux losses that often attenuate light rays incident upon metal-blased reflectors, as previously described with respect to FIGS. 1A and 1B.

In another embodiment, the plurality of hollow cavities in the LMW are configured to provide some level of apodization, which may serve to improve luminous uniformity within the waveguide. It is understood that the LMW 100 is a light preprocessor and that more than one edge of the PW 130 may have an associated LMW 100 mounted to it, as display exigencies may require. As a consequence of configuring the LMW 100 for apodization, light flux (i.e., intensity of light) entering the PW 130 may no longer be spatially isotropic, but may exhibit a gradient or other desired profile. The gradient may be desirable because light injected from the LMW 100 into the PW 130 may undergo depletion as it travels through the array and encounters activated pixels. Apodization can compensate for any such depletion effects, and where it is desirable that such apodization be applied, the LMW can be configured to achieve the desired apodization by geometrically configuring the plurality of hollow cavities in a suitable manner The specific nature of the apodization gradient (linear, exponential, tuned to the pixel efficiencies present on the display surface, etc.) is adjusted to maximize uniformity in any given display setting. These represent different optimization schemas for this embodiment, and are variations intended to tune the performance of any given display system to optimize the luminous uniformity.

Figure 7:
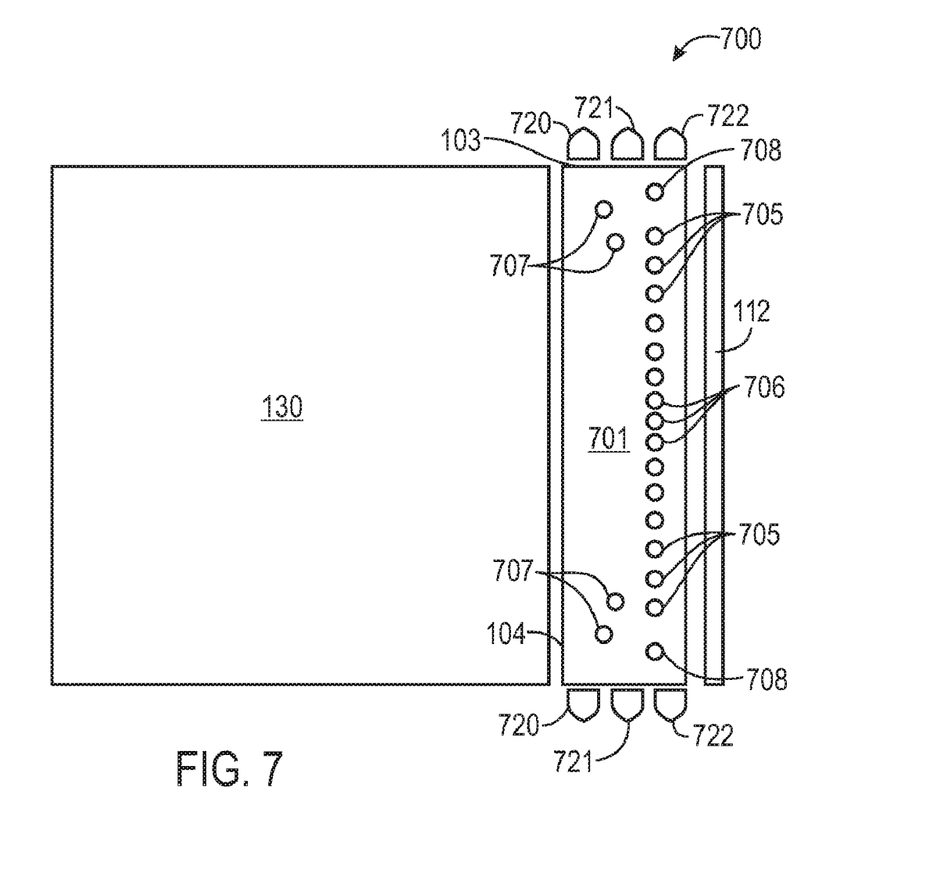
FIG. 7 is a top view schematic illustrating a light mixing waveguide having varying inter-cavity spacing distances between adjacent cavities, in accordance with another embodiment of the present disclosure.

Referring now to FIG. 7, apodization of the light being ejected by the LMW 101 or 701 through its light transfer edge 104 can be achieved by such geometric strategies as defined above, by suitable selection of the position and size of the cavities so as to create more light flux in some parts of the light transfer edge 104 and less light flux in other parts of the light transfer edge 104, which is a feature that can be called for in display systems based on frustrated TIR which tend to deplete light across the display surface; such light depletion can be compensated for by apodization of the light sources. In this instance, the apodization is applied not to discretized point sources but rather to the highly mixed flux that the waveguide 701 creates from the initial light injected into the LMW from the light sources (120, or 720, 721, and/or 722, etc., as required). Therefore, apodization can be used to provide compensation of flux intensity for light entering the PW 130 to improve the luminous uniformity of displays that exhibit light depletion as a function of distance from the light source and the number of actuated pixels injected light encounters prior to total depletion.

The inter-cavity spacing (d) between the cavities can be either uniform (equidistant) or graded as a function of distance from the light sources 120 at the side edges 103. FIG. 7 illustrates different possible architectural arrangements in respect to both the light sources (e.g., LEDs) and their respective distribution along the edges 104 of the waveguide 701, as well as in respect to the interspacing and spatial distribution of the cavities 705, 706, 707, 708 formed inside the waveguide 701. For example, the plurality of cavities 105 depicted in FIGS. 1A and 1B illustrate one possible embodiment that indicates the relative positions of a plurality of cavities 105 that are formed inside the waveguide 101. The distribution of the cavities 105 are shown as being collinear with an equidistant inter-cavity spacing (d), and nearer reflectorized edge 102 (and its associated reflector 112) than they are to the light transfer edge 104. Alternative embodiments may use other arrangements of the plurality of cavities. Alternative embodiments are not limited to this geometric distribution of the cavities, nor are these embodiments restricted to any given quantity or size of cavities 105, so long as the ray splitting gives rise to the targeted amount of light mixing. For example, a light mixing waveguide 700 depicted in FIG. 7 illustrates a transparent waveguide 701 having cavities 705 (e.g., hollow air-filled cavities) are spaced farther apart toward the distil termini edges 103, and closer together toward the center of the waveguide 701. Although shown as collinear, they need not be collinear and can be distributed in any orientation that provides good light mixing. Furthermore, it is also possible to position certain cavities 707 in other locations within the waveguide 701, which may serve to redirect light more favorably toward the reflector 112 and/or other cavities 708.

The interior composition of the cavities 705, 706, 707, 708 need not be isotropic and uniform if an anisotropy in refractive index inside the cavities leads to optical benefits in regard to light mixing, nor are the illustrated embodiments limited to having each of the cavities having the same shape, the same size, or the same interior composition and/or refractive index. Furthermore, while a preferred embodiment calls for the walls of the cavities 705, 706, 707, 708 to be perpendicular to the top surface 106 of the waveguide 701 and, consequently, parallel to 103 and 104, for the purpose of insuring that incident light rays encountering said cavities do not perturb away from angles that comply with total internal reflection within the interior of the slab waveguide 701, alternative embodiments are not limited to such a geometric restriction, which may be called for in certain instances when the perturbation of rays does not present a significantly deleterious side effect in regard to system noise level or contrast ratio degradation.

FIG. 7 shows a multiplicity of light sources 720, 721, and 722, that may be used to replace the single light source 120 abutted on the edge 104 depicted in FIGS. 1A and 1B. It is possible, in some situations, for light source 720 to correspond to one primary color, 721 to another primary color, and 722 another primary color; or they can all be multiple-light-source systems to begin within, and arrayed along the edge(s) 103 due to geometric, optical, mechanical, and/or thermal considerations that dictate the use of smaller LEDs to fill edge 103. It is common in the art to try to fit the insertion face of an LED to the edge of the waveguide into which its light is to be inserted, to avoid overshoot and other lossy effects. The techniques described herein are not limited to either one or three LEDs, but to any illumination sources of any kind that are arrayed along the side edges 103. The examples shown in both LMWs 100 and 700 are for illustrative purposes only and are not intended to limit the all embodiments to these specifically quantified pluralities of light sources, nor are all embodiments tied to any specific location of the light sources 720, 721, and/or 722 or 120 along the edge(s) 103.

Figure 8A:
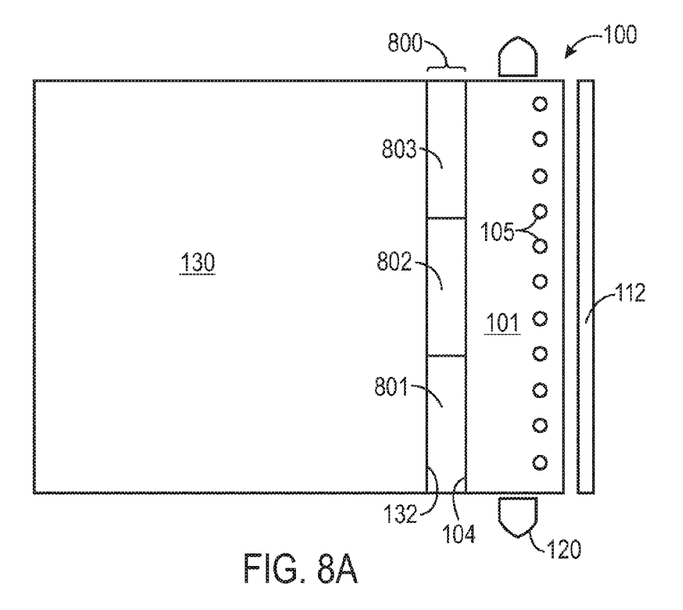
FIGS. 8A and 8B are a top view schematic and a perspective view schematic, respectively, illustrating a light mixing waveguide adjacent a total internal reflection primary waveguide, wherein an intercalated region between the LMW and the PW may have one or more refractive indices to adjust the intensity of light (light flux) that enters the PW, in accordance with another embodiment of the present disclosure.
Figure 8B:
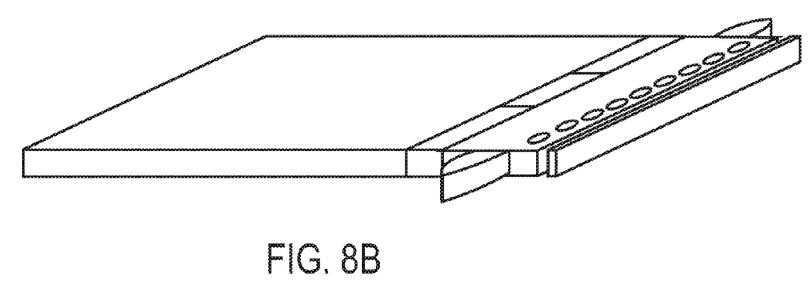

FIG. 8 illustrates an alternative embodiment wherein the air gap between the light transfer edge 104 and the light injection edge 132 of the PW 130 is filled with an intercalated region 800 having one or more specific refractive indices. Region 800 represents an intercalated interstitial region between the PW 130 and the waveguide 101 that may be configured with respect to its refractive index, particularly in reference to the ratio of region 800 refractive index to the refractive index of the waveguide 101, and the ratio of region 800 refractive index to the refractive index of the PW 130. It is to be noted that while region 800 can be uniform and isotropic with respect to its refractive index, this is not a restriction on all embodiments, and to illustrate the significance of this fact, the region 800 has been shown divided (arbitrarily, for the sake of illustration only) into three discrete regions, 801, 802, and 803. In this example, discrete regions 801 and 803 of element 800 have a lower refractive index than the middle subelement 802, with the result that light passing into region 800 from the waveguide 101 through light transfer edge 104 will have greater flux transfer into the higher refractive index region 802 than it will through the lower refractive index regions 801 and 803. This difference in transfer efficiency across the boundary from edge 104 to the respective discrete regions of 800 (discrete regions 801, 802, and 803) is premised on the different critical angles presented to light that encounters the boundary between 104 and 800 after having traveled through the waveguide 101. The potential benefit of subdividing region 800 into discrete subregions bearing different refractive indices is that such variable refractive index regions serve to apodize and adjust the intensity of light entering the PW 130 based on the position along the edge 132 that the light enters, which can serve to improve the luminous uniformity of the light available to the primary waveguide for use in the final application (whether that be a TIR-based waveguide, a backlight for an LCD system, or other application). It should be noted that the partitioning of the region 800 into three discrete subregions is purely arbitrary, and that the region 800 can be divided into any number of regions. Alternatively, instead of discrete regions within region 800, a smooth gradient of refractive index within the region 800 may be used to achieve apodization of light being transferred from the waveguide 101 into the PW 130 as the light passes through the light transfer edge 104 into region 800 to be potentially apodized and then passing into the PW 130 through the light injection edge 132. Therefore, region 800 can bear a uniform refractive index chosen for its critical angle, it can bear different partitioned subregions with individually-tuned refractive indices, or it can be manufactured with a targeted gradient in its refractive index composition. The thickness of the region 800 as it fills the space between light transfer edge 104 and light injection edge 132 is arbitrary and is expected to be small for practical reasons, although in alternative embodiments any given spaced-apart relation between 104 and 132 (and consequently, any given thickness of region 800, however it may be composed) may be used.

It should be understood that the general principle described herein, the use of cavities 105, to achieve ray splitting to facilitate light mixing, is not only suitable for mixing primary colors (e.g., red, green, and blue, which may correspond, for illustrative purposes, to the respective light sources 720, 721, and 722), but it may also be suitable for general optical applications where light mixing is required, including automotive applications, avionic applications, general lighting applications, display applications, etc. Its value in removing optical artifacts associated with the interaction of discretized light sources with an array of pixels or micro-optical structures is important in one specific area of art, but this does not limit the range of applicability of the techniques described herein. The specific details provided are for illustrative purposes only and should not be read as restricting the scope of the claimed subject matter.

Embodiments of the techniques described herein can enhance the luminous uniformity of display systems comprised of edge-illuminated slab waveguides that are thinner than the uniformity threshold limit (t) without incurring undesirable optical artifacts arising out of the geometric interaction of point sources with the array of pixels or micro-optical structures associated with the pixel actuation mechanism. The various embodiments described herein can be implemented on a host of display systems that could be expected to use edge-illuminated slab waveguides and/or associated light-recycling backlight subsystems or FTIR-based display technologies and would thus would be highly desirable and lead to improved image generation by system architectures based on such planar illumination architectures. These embodiments may also facilitate the mixing of primary color lights (e.g., red, green, and blue) and can also be extended to more general optical and light applications where the smooth mixing of point sources of lights (e.g., LEDs) into a uniform flux, or other desired light flux profile, passing through the surface of the light transfer edge is desirable.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A light mixing waveguide comprising a transparent slab waveguide having a reflectorized edge, a pair of opposing side edges adjacent to the reflectorized edge, a light transfer edge opposite the reflectorized edge, and a plurality of cavities formed inside the slab waveguide, wherein at least one of the side edges is configured to receive light from one or more light sources so that the received light is totally-internally reflected from top and bottom surfaces of the transparent slab waveguide, and wherein interaction of the received light with one or more of the cavities and the reflectorized edge mixes the received light prior to the received light passing through the light transfer edge and into a target optical system.

2. The light mixing waveguide of claim 1, wherein the cavities have a hollow circular cross-section, thus forming cylindrical hollow cavities within the transparent slab.

3. The light mixing waveguide of claim 1, wherein the cavities have a polygonal cross-section.

4. The light mixing waveguide of claim 1, wherein at least a portion of the received light that encounters one or more of the cavities undergoes reflection-refraction ray splitting.

5. The light mixing waveguide of claim 1, wherein the received light comprises different primary colors that are mixed through the mutual interaction of the light with the reflectorized edge and cavities.

6. The light mixing waveguide of claim 1, wherein the plurality of cavities are equidistant from one another.

7. The light mixing waveguide of claim 1, wherein the plurality of cavities are collinear.

8. The light mixing waveguide of claim 1, wherein the plurality of cavities are closer to the reflectorized edge than to the light transfer edge.

9. The light mixing waveguide of claim 7, wherein the plurality of cavities are variably spaced throughout the transparent slab to provide isotropic uniformity of the light flux emitted through the light transfer edge.

10. The light mixing waveguide of claim 1, wherein the plurality of cavities are variably distributed throughout the transparent slab to provide non-isotropic uniformity of the light flux emitted through the light transfer edge.

11. The light mixing waveguide of claim 1, wherein the shape of the light mixing waveguide is at least one of rectangular, polygonal, trapezoidal or a parallelogram.

12. The light mixing waveguide of claim 1, further comprising a reflector in space-apart relation to the reflectorized edge, thereby forming a gap between the reflectorized edge and the reflector.

13. The light mixing waveguide of claim 1, comprising a reflecting element deployed adjacent at least one of the reflectorized edge, side edge, top surface, and bottom surface of the transparent slab waveguide to reduce light leakage.

14. The light mixing waveguide of claim 1, wherein one or more light sources are embedded inside the transparent slab waveguide.

15. The light mixing waveguide of claim 1, wherein the at least one side edge is configured to receive light from one or more light sources that are tilted or angled away from the normal axis to the plane of the at least one side edge.

16. The light mixing waveguide of claim 1, wherein the cavities are bounded by walls that are substantially parallel to the side edges, the reflectorized edge, and the light transfer edge and substantially perpendicular to the top and bottom surfaces of the waveguide.

17. The light mixing waveguide of claim 16, wherein the walls do not exhibit cross-sectional isotropy or symmetry, such that the cross-sectional areas of the cavities at any given point through each cavity differs from one location in the cavity to another location in the cavity.

18. The light mixing waveguide of claim 1, wherein the target optical system is a primary waveguide separated from the light mixing waveguide by a gap.

19. The light mixing waveguide of claim 18, wherein the gap comprises an intercalated region having a specific refractive index that fills the gap between the light mixing waveguide and the primary waveguide.

20. The light mixing waveguide of claim 18, wherein the intercalated region is composed of different discrete regions that differ in refractive index so as to cause the passage of light from the light mixing waveguide to the primary waveguide to exhibit different transfer efficiencies as a function of position along the boundary of the intercalated region and the light mixing waveguide.

* * * * *